United States Patent
Thomas et al.

(10) Patent No.: US 6,330,512 B1
(45) Date of Patent: Dec. 11, 2001

(54) HYBRID GATHER GROUND-ROLL SUPPRESSION

(75) Inventors: James W. Thomas; John M. Hufford, both of Bartlesville, OK (US)

(73) Assignee: Phillips Petroleum Company, Bartlesville, OK (US)

(*) Notice: Subject to any disclaimer, the term of this patent is extended or adjusted under 35 U.S.C. 154(b) by 0 days.

(21) Appl. No.: 09/625,099

(22) Filed: Jul. 25, 2000

(51) Int. Cl.$^7$ .................................................. G06F 19/00
(52) U.S. Cl. .................................................. 702/1; 702/14
(58) Field of Search .................................. 702/1, 17, 14, 702/16; 367/46, 72

(56) References Cited

U.S. PATENT DOCUMENTS

| | | | |
|---|---|---|---|
| 4,935,905 | 6/1990 | Gassaway | 367/59 |
| 5,511,040 | 4/1996 | Nyland | 367/56 |
| 5,572,483 | 11/1996 | Chambers et al. | 367/45 |
| 5,787,051 | 7/1998 | Goodway et al. | 367/56 |
| 5,850,622 * | 12/1998 | Vassiliou et al. | 702/17 |
| 6,021,379 * | 2/2000 | Duren et al. | 702/16 |
| 6,026,058 | 2/2000 | Thomas | 367/56 |
| 6,049,759 * | 4/2000 | Etgen | 702/14 |

* cited by examiner

Primary Examiner—Jay Patidar
Assistant Examiner—Victor J. Taylor
(74) Attorney, Agent, or Firm—Richmond, Hitchcock, Fish and Dollar

(57) ABSTRACT

This invention relates to the general subject of seismic exploration and, in particular, to seismic processing and methods for attenuating ground roll in land and ocean bottom seismic surveys. According to a first aspect of the instant invention, there is provided a method of attenuating non-primary reflection events such as ground roll in an unstacked gather. In the preferred embodiment, the collected seismic data will be analyzed to determine the approximate velocity at which the ground roll appears to travel through the section. As a next step, a single-velocity migration is performed on the seismic data at the selected velocity. Those seismic events that are moved by the migration past an "attenuation line" on the section are intentionally discarded or attenuated. Finally, a reverse single velocity migration is performed which places the reflectors—minus those events such as ground roll that have been attenuated—back at their original unmigrated times.

20 Claims, 6 Drawing Sheets

HYBRID GATHER GROUND-ROLL SUPPRESSION

This invention relates to the general subject of seismic exploration and, in particular, to seismic processing and methods for attenuating ground roll in land and ocean bottom seismic surveys.

BACKGROUND OF THE INVENTION

The broad goal of a seismic survey is to image or map the subsurface of the earth by sending energy down into the ground and recording the "echoes" that return from the rock layers below. The source of the down-going sound energy might come, for example, from explosions or seismic vibrators on land, or air guns in marine environments. During a seismic survey, the energy source is systematically positioned at locations near the surface of the earth above a geologic structure of interest. Each time the source is activated, it generates a seismic signal that travels downward through the earth, is partially reflected, and, upon its return, is recorded at a great many locations on the surface. The seismic signals are partially reflected from discontinuities of various types in the subsurface (including reflections from "rock layer"boundaries) and the reflected energy is transmitted back to the surface of the earth where it is recorded as a function of travel time. The sensors that are used to detect the returning seismic energy are usually geophones (land surveys) or hydrophones (marine surveys). The recorded returning signals, which are continuous electrical analog signals which represent amplitude versus time, are generally quantized using digital computers so that each data sample point may be operated on individually.

Multiple source/recording combinations are subsequently combined to create a near continuous profile of the subsurface that can extend for many miles. In a two-dimensional (2D) seismic survey, the recording locations are generally laid out along a single line, whereas in a three dimensional (3D) survey the recording locations are distributed across the surface in a grid pattern. In simplest terms, a 2D seismic line can be thought of as giving a cross sectional picture (vertical slice) of the earth layers as they exist directly beneath the recording locations. A 3D survey produces a data "cube"or volume that is, at least conceptually, a 3D picture of the subsurface that lies beneath the survey area. In reality, though, both 2D and 3D surveys interrogate some volume of earth lying beneath the area covered by the survey.

A seismic survey is composed of a very large number of individual seismic recordings or traces. In a typical 2D survey, there will usually be several tens of thousands of traces, whereas in a 3D survey the number of individual traces may run into the multiple millions of traces. Chapter 1, pages 9–89, of *Seismic Data Processinig* by Ozdogan Yilmaz, Society of Exploration Geophysicists, 1987, contains general information relating to conventional 2D processing and that disclosure is incorporated herein by reference. General background information pertaining to 3D data acquisition and processing may be found in Chapter 6, pages 384–427, of Yilmaz, the disclosure of which is also incorporated herein by reference. Additionally, U.S. Pat. No. 6,026,058 contains information pertinent to 3D surveys and that reference is incorporated herein by reference.

A modern seismic trace is a digital recording (analog recordings were used in the past) of the acoustic energy reflecting from inhomogeneities or discontinuities in the subsurface, a partial reflection occurring each time there is a change in the elastic properties of the subsurface materials. The digital samples are usually acquired at 0.002 second (2 millisecond or "ms") intervals, although 4 millisecond and 1 millisecond sampling intervals are also common. Each discrete sample in a conventional digital seismic trace is associated with a travel time, and in the case of reflected energy, a two-way travel time from the source to the reflector and back to the surface again, assuming, of course, that the source and receiver are both located on the surface. Many variations of the conventional source-receiver arrangement are used in practice, e.g. VSP (vertical seismic profiles) surveys. Further, the surface location of every trace in a seismic survey is carefully tracked and is generally made a part of the trace itself (as part of the trace header information). This allows the seismic information contained within the traces to be later correlated with specific surface and subsurface locations, thereby providing a means for posting and contouring seismic data—and attributes extracted therefrom—on a map (i.e., "mapping").

The data in a 3D survey are amenable to viewing in a number of different ways. First, horizontal "constant time slices" may be taken extracted from a stacked or unstacked seismic volume by collecting all of the digital samples that occur at the same travel time. This operation results in a horizontal 2D plane of seismic data. By animating a series of 2D planes it is possible for the interpreter to pan through the volume, giving the impression that successive layers are being stripped away so that the information that lies underneath may be observed. Similarly, a vertical plane of seismic data may be taken at an arbitraiy azimuth through the 3D volume by collecting and displaying the seismic traces that lie along a particular line. This operation, in effect, extracts an individual 2D seismic line from within the 3D data volume.

Seismic data that have been properly acquired and processed can provide a wealth of information to the explorationist, one of the individuals within an oil company whose job it is to locate potential drilling sites. For example, a seismic profile gives the explorationist a broad view of the subsurface structure of the rock layers and often reveals important features associated with the entrapment and storage of hydrocarbons such as faults, folds, anticlines, unconformities, and sub-surface salt domes and reefs, among many others. During the computer processing of seismic data, estimates of subsurface rock velocities are routinely generated and near surface inhomogeneities are detected and displayed. In some cases, seismic data can be used to directly estimate rock porosity, water saturation, and hydrocarbon content. Less obviously, seismic waveform attributes such as phase, peak amplitude, peak-to-trough ratio, and a host of others, can often be empirically correlated with known hydrocarbon occurrences and that correlation applied to seismic data collected over new exploration targets.

Of course, noise that might be recorded on the seismic record has the potential to obscure information that would otherwise be useful in interpretation. One of the more troublesome sources of coherent noise is known as "ground roll" in the argot of the trade. Simply put, ground roll is surface-wave energy that travels along or near the surface of the "ground", where ground should be interpreted in its broadest sense to include the sea floor. Ground roll is usually described as a "direct" (as opposed to a "reflected") wave, because it travels directly along the surface from the source to the recording device without having first traveled down into the earth. It is usually characterized by relatively low velocity, low frequency, and high amplitude. Theoretically speaking, ground roll is one type of Rayleigh wave that arises because of the coupling of compressional waves and the vertical component of shear waves that propagate along the free surface.

Because ground roll travels at a relatively low velocity, its expression on the seismic gather tends to "cut across" deeper arrivals. Further, because ground roll tends to be a very high amplitude event in comparison with the reflected seismic signals, it usually overwhelms desirable signals where ever it is found on the seismic record. Further, and because of its high amplitude, any seismic processing step that mixes digital samples either in time or distance will tend to "smear" the ground roll to adjacent times and traces. Thus, the elimination of ground roll has been in the past—and will continue to be in the future—a high priority among seismic processors.

There have been many different methods developed which have as their aim the suppression of ground roll on the seismic record. Of course, the most obvious place to address the problem is to eliminate or reduce it during seismic acquisition. One brute-force method that has been applied with some limited success (principally on the permafrost in Alaska) is digging a trench between the source and the geophones, thereby interrupting the transmission of the ground roll energy along the surface. More elegant solutions include specialized geophones that reject surface waves (e.g., Gassaway, U.S. Pat. No. 4,935,905, the disclosure of which is incorporated by reference) and specialized array layouts/geometries (e.g., Sallas, U.S. Pat. No. 4,723,231, the disclosure of which is also incorporated herein by reference). However, these and other field-based inventions do not help the seismic processor who must deal after-the-fact with ground roll on the seismic section.

Of course, when ground roll is first noticed after the data have been collected—and also in those cases where field-based methods have not been completely successful—it is necessary to turn to software-based methods to attenuate this noise source after-the-fact. Many different schemes have been suggested for dealing with this problem. For example, because ground roll tends to a relatively low frequency event, it is conventional to apply various low-cut and notch filters to attenuate it. Further, because ground roll tends to be found at a lower velocity than any actual seismic reflection velocity, various forms of velocity filtering (e.g., "dip filtering", "fan filters", and "F-K filters") have also been used with varying degrees of success. Still further, methods of rejecting "high amplitude events" in a stack have been somewhat successful (e.g., non-linear stacks such as a median stack). None of these methods have been entirely successful, at least in part because they have a tendency to attenuate the reflection data along with the noise. One reason for this is that the separation between ground roll and reflection data in frequency space (or velocity space, etc.) is imperfect.

Heretofore, as is well known in the seismic processing and seismic interpretation arts, there has been a need for a method of attenuating ground roll on a seismic section which does not suffer from the disadvantages of the prior art. Accordingly, it should now be recognized, as was recognized by the present inventor, that there exists, and has existed for some time, a very real need for a method of seismic data processing that would address and solve the above-described problems.

Before proceeding to a description of the present invention, however, it should be noted and remembered that the description of the invention which follows, together with the accompanying drawings, should not be construed as limiting the invention to the examples (or preferred embodiments) shown and described. This is so because those skilled in the art to which the invention pertains will be able to devise other forms of this invention within the ambit of the appended claims.

SUMMARY OF THE INVENTION

In accordance with the present invention, a method is disclosed herein for the suppression of high-energy low-velocity events in seismic data. In particular, the instant invention operates on unstacked gathers to attenuate ground roll that might be present thereon.

According to a first aspect of the instant invention, there is provided a method of attenuating non-primary reflection events such as ground roll in an unstacked gather. In the preferred embodiment, the collected seismic data will be analyzed to determine the approximate velocity at which the ground roll appears to travel through the section. Next, an appropriate attenuation line is chosen. Then, a single-velocity migration is performed on the seismic data at a velocity related to the ground roll velocity. Seismic energy that is moved by the migration beyond the attenuation line is intentionally discarded or attenuated. Finally, a reverse single velocity migration is performed which places the reflectors back at their original unmigrated times, preferably the ground roll events have been attenuated. In the preferred embodiment, an F-K migration will be used to perform the single velocity migration.

According to another aspect of the instant invention, there is provided a method of ground roll attenuation substantially as described above, but wherein the seismic data are first sorted into "hybrid gathers" of the sort taught by Thomas in U.S. Pat. No. 6,026,058, the disclosure of which is incorporated herein by reference. That is, in this embodiment the data are preferably sorted into hybrid gathers before they are migrated and reverse migrated.

The foregoing has outlined in broad terms the more important features of the invention disclosed herein so that the detailed description that follows may be more clearly understood, and so that the contribution of the instant inventor to the art may be better appreciated. The instant invention is not to be limited in its application to the details of the construction and to the arrangements of the components set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention.

DETAILED DESCRIPTION

Figure 1:
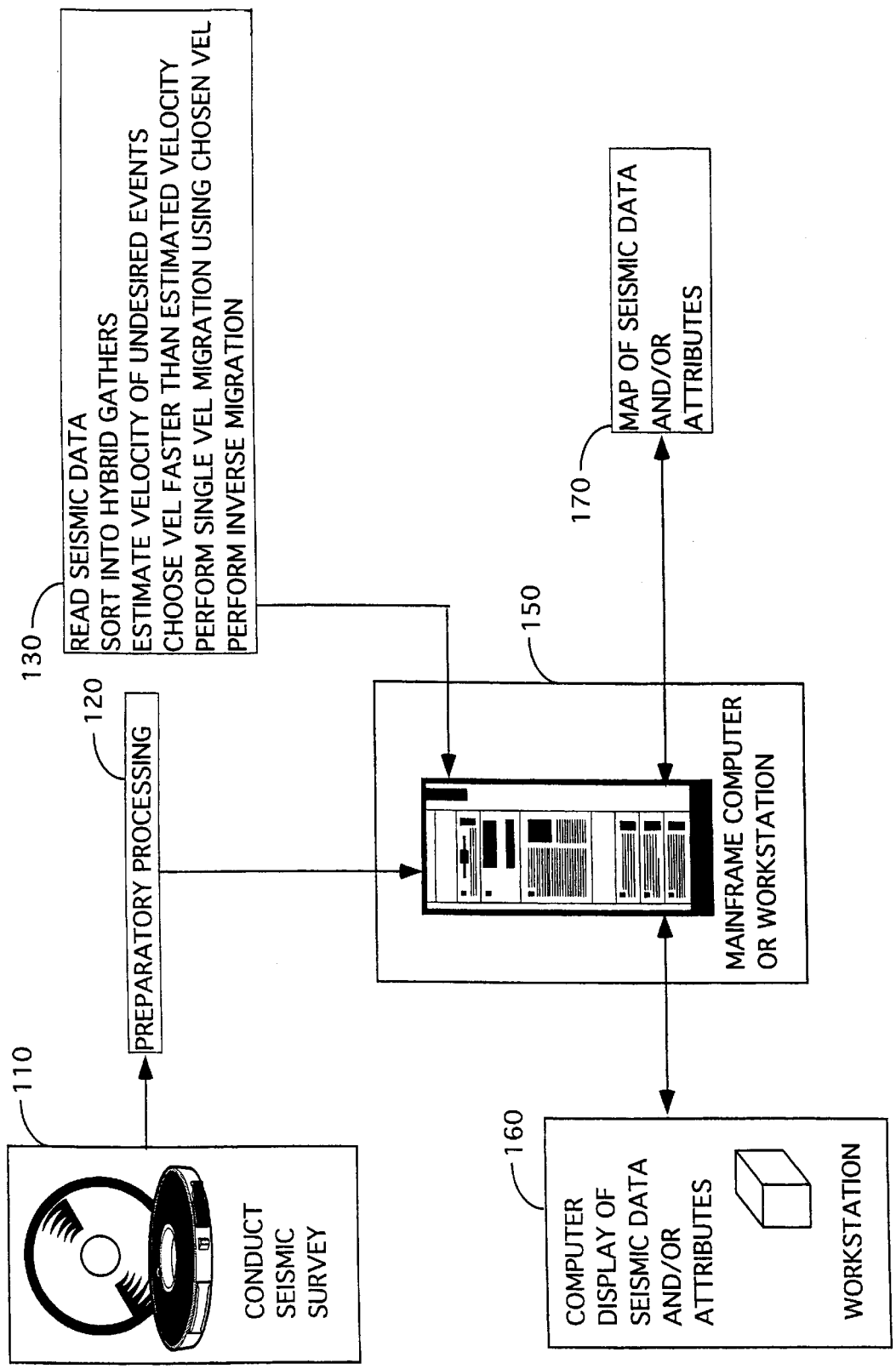
FIG. 1 illustrates generally the environment in which the invention disclosed herein would typically be used.

While this invention is susceptible of embodiment in many different forms, there is shown in the drawings, and will be described hereinafter in detail, some specific embodiments of the instant invention. It should be understood, however, that the present disclosure is to be considered an exemplification of the principles of the invention and is not intended to limit the invention to the specific embodiments or algorithms so described.

Environment of the Invention

FIG. 1 illustrates the general environment in which the instant invention would typically be used. Seismic data 110 are collected in the field over a subsurface target of potential economic importance and are then sent to a processing center. There a variety of preparatory processes 120 are applied to the seismic traces to make them ready for use by the methods disclosed hereinafter. The processed traces would then be made available for use by the instant invention and might be stored, by way of example only, on hard disk, magnetic tape, magneto-optical disk, DVD disk, or other mass storage means.

The methods disclosed herein would best be implemented in the form of a computer program 130 that has been loaded onto a general purpose programmable computer 150 where it is accessible by a seismic interpreter or processor. A general purpose computer 150 includes, in addition to mainframes, workstations and personal computers, computers that provide for parallel and massively parallel computations, wherein the computational load is distributed between two or more processors.

A program 130 embodying the instant invention might be conveyed into the computer that is to execute it by means of, for example, a floppy disk, a magnetic disk, a magnetic tape, a magneto-optical disk, an optical disk, a CD-ROM, a DVD disk, a RAM card, flash RAM, a RAM card, a PROM chip, or loaded over a network. In a typical seismic processing environment, the methods of the instant invention would be made part of a larger package of software modules that is designed to perform many of the processing steps listed in FIG. 1. After processing by the instant methods, the resulting traces would then typically be sorted into gathers, stacked, and displayed either at a high resolution color computer monitor 160 or in hard-copy form as a printed seismic section or a map 170. The seismic interpreter would then use the displayed images to assist him or her in identifying subsurface features conducive to the generation, migration, or accumulation of hydrocarbons.

Preparatory Processing

Figure 2:
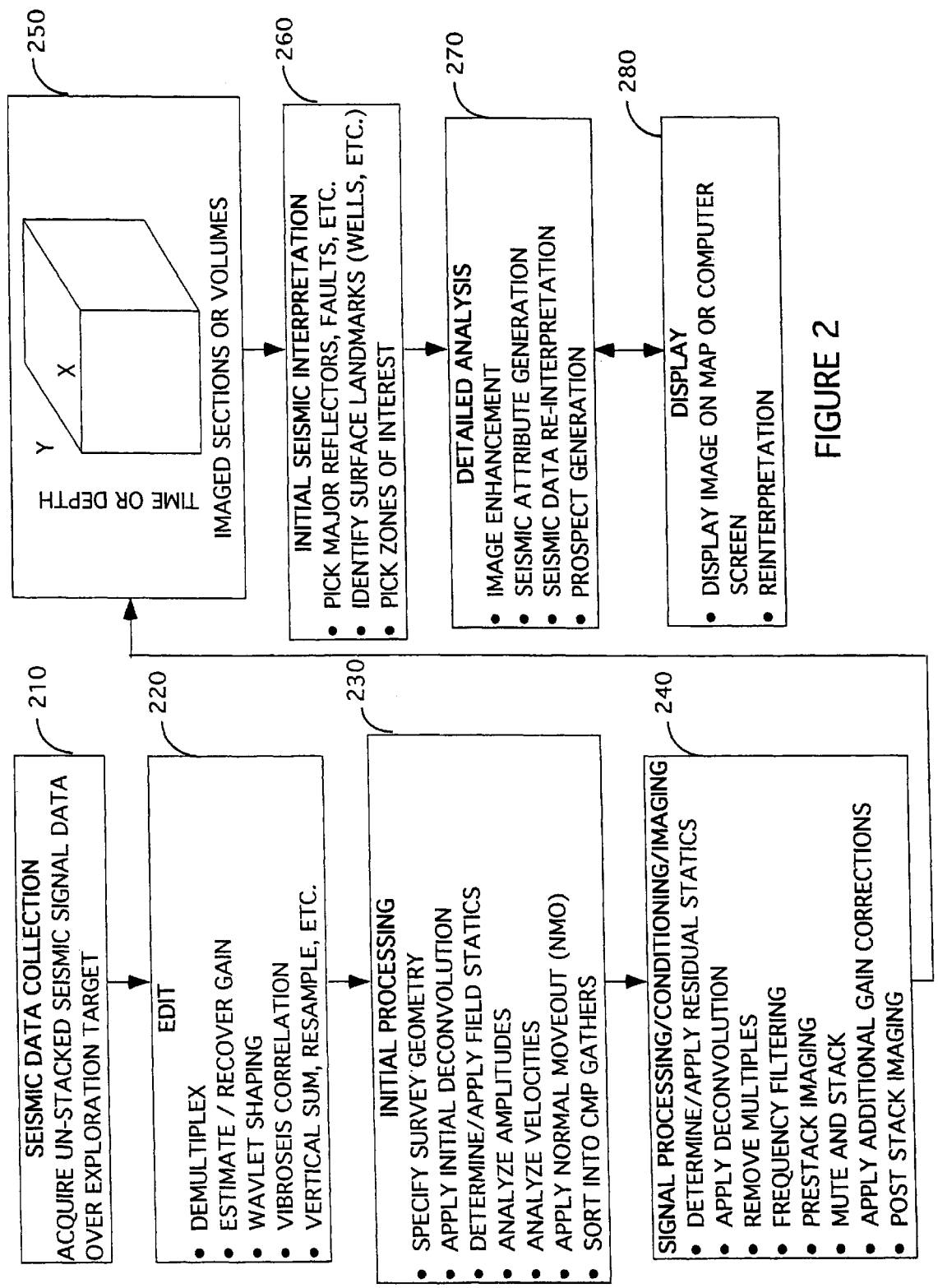
FIG. 2 illustrates some steps in a typical seismic processing sequence.

As a first step, and as is generally illustrated in FIG. 2, a 2D or 3D seismic survey is conducted over a particular volume of the earth's subsurface (step 210). The data that are collected in the field consist of unstacked (i.e., unsummed) seismic traces which contain digital information representative of the volume of the earth lying beneath the survey. Methods by which such data are obtained and processed into a form suitable for use by seismic processors and interpreters are well known to those skilled in the art. Additionally, those skilled in the art will recognize that the processing steps illustrated in FIG. 2 are only broadly representative of the sorts of steps that seismic data would normally go through before it is interpreted: the choice and order of the processing steps, and the particular algorithms involved, may vary markedly depending on the particular seismic processor, the signal source (dynamite, vibrator, etc.), the survey location (land, sea, etc.) of the data, and the company that processes the data.

The purpose of a seismic survey is to acquire a collection of spatially related seismic traces over a subsurface target of some potential economic importance. Data that are suitable for analysis by the methods disclosed herein might consist of, for purposes of illustration only, an unstacked 2-D seismic line, an unstacked 2-D seismic line extracted from a 3D seismic survey or, preferably, an unstacked 3D portion of a 3D seismic survey. The invention disclosed herein is most effective when applied to a group of unstacked seismic traces that have an underlying spatial relationship with respect to some subsurface geological feature. Again for purposes of illustration only, the discussion that follows will be couched in terms of traces contained within an unstacked 3-D survey, although any assembled group of spatially related unstacked seismic traces could conceivably be used.

After the seismic data are acquired, they are typically taken to a processing center where some initial or preparatory processing steps are applied to them. As is illustrated in FIG. 2, common early processing steps include basic trace editing 220 and specification of the geometry of the survey (step 230). As part of this step, each seismic trace is associated with both the physical receiver (or array) on the surface of the earth that recorded that particular trace and the "shot" (or generated seismic signal) that was recorded. The positional information pertaining to both the shot surface position and receiver surface position are then made a permanent part of the seismic trace "header," a general purpose storage area that accompanies each seismic trace. This shot-receiver location information is later used to determine the position of the "stacked" seismic traces. It would normally be after the velocity analysis/NMO (i.e., "normal moveout") processing steps that one aspect of the instant invention would first be applied. An NMO correction adjusts the samples in each seismic trace according to their distance from that shot so that energy returning from the same reflectors are aligned at the same time on the seismic trace. This process is well known to those skilled in the art and will not be discussed further herein, although additional details are available in Yilmaz, cited previously, at pages 154–166, the disclosure of which is incorporated herein by reference.

It should be noted that the steps of the instant invention might be applied any time after the specification of the survey geometry 230. However, in the preferred embodiment at least field statics will have been calculated and applied prior to treatment by the methods taught herein. It is also preferable that, as discussed below, additional processing/signal enhancement techniques (e.g., deconvolution, frequency filtering, surface consistent deconvolution, surface consistent statics, etc.) should be applied to the data before it is processed via the instant methods. Still further, it is preferable that the data will have been previously corrected for normal moveout. In general, the instant inventors have discovered that better results are obtained when the data are as "clean" as possible. That being said, it should be noted that the instant method is appropriate for use with any sort of unmigrated and unstacked seismic data.

After the initial pre-stack processing is completed, it is customary to condition the seismic signal on the unstacked seismic traces before creating stacked (or summed) data volumes (step 240). In FIG. 2, the "Signal Processing/Conditioning/Imaging" step 240 suggests a typical processing sequence, although those skilled in the art will recognize that many alternative processes could be used in place of the ones listed in the figure. In any case, the ultimate goal from the standpoint of the explorationist is the production of a stacked seismic volume or, in the case of 2D data, a stacked seismic line for use in the exploration for hydrocarbons within the subsurface of the earth. Those skilled in the art will know seismic data is conventionally "stacked" by first sorting it into "CMP" (i.e., common mid-point) gathers and then, for each such gather, summing together all of the digital seismic values at the same "time" level, thereby producing a single average or composite trace from the seismic traces in the gather.

As is suggested in FIG. 2, any digital sample within a stacked seismic volume is uniquely identified by an (X, Y, TIME) triplet: the X and Y coordinates representing some position on the surface of the earth, and the time coordinate measuring a recorded arrival time within the seismic trace (step 250). For purposes of specificity, it will be assumed that the X direction corresponds to the "in-line" direction, and the Y measurement corresponds to the "cross-line" direction, as the terms "in-line" and "cross-line" are generally understood to mean in the art. Although time is the preferred and most common vertical axis unit, those skilled in the art understand that other units are certainly possible might include, for example, depth or frequency. Additionally, it is well known to those skilled in the art that it is possible to convert seismic traces from one axis unit (e.g., time) to another (e.g., depth) using standard mathematical conversion techniques. That being said, the discussion that follows will be framed largely in terms of "time" as a vertical axis measure, but that choice was made for purposes of specificity, rather than out of any intention to so limit the methods disclosed herein. Further, when "time" is described hereinafter as a vertical axis of a seismic trace, that term should be broadly construed to also include any other applicable vertical axis, including depth or frequency.

Another important use for seismic data is as a source for seismic attributes (step 270). As is well known to those skilled in the art, seismic attributes are values that are calculated from seismic data and that serve to highlight some specific property or feature of the data that might not otherwise be apparent. Although FIG. 2 seems to indicate that seismic attribute generation 270 takes place relatively late in the processing sequence, that is not always the case and attributes might potentially be calculated at almost any point in the sequence.

The explorationist may do an initial interpretation 260 of the resulting stacked volume, wherein he or she locates and identifies the principal reflectors and faults wherever they occur in the data set. Finally, as noted in FIG. 2, the explorationist will use the processed seismic data to locate subsurface structural or stratigraphic features conducive to the generation, accumulation, or migration of hydrocarbons (i.e., prospect generation 270). This effort may incorporate additional data from a variety of non-seismic sources including, for example, well logs, satellite surveys, gravity surveys, etc. Additionally, the explorationist may use the migrated data volume (either stacked or unstacked) as a source for the generation of seismic attributes 270 that may be displayed 160/280 and studied in their own right. Seismic attributes 270 can reveal subsurface details that are at odds with the initial seismic data interpretation. Thus, the interpreter may reinterpret 280 the seismic section or volume before moving to the prospect generation 270 stage.

PREFERRED EMBODIMENTS

According to a first preferred aspect of the instant invention, there is provided a method of attenuating or eliminating certain types of surface waves such as ground roll which utilizes a conventional pre-stack migration algorithm. Additionally, in the preferred embodiment a constant-velocity migration will be utilized.

Figure 3:
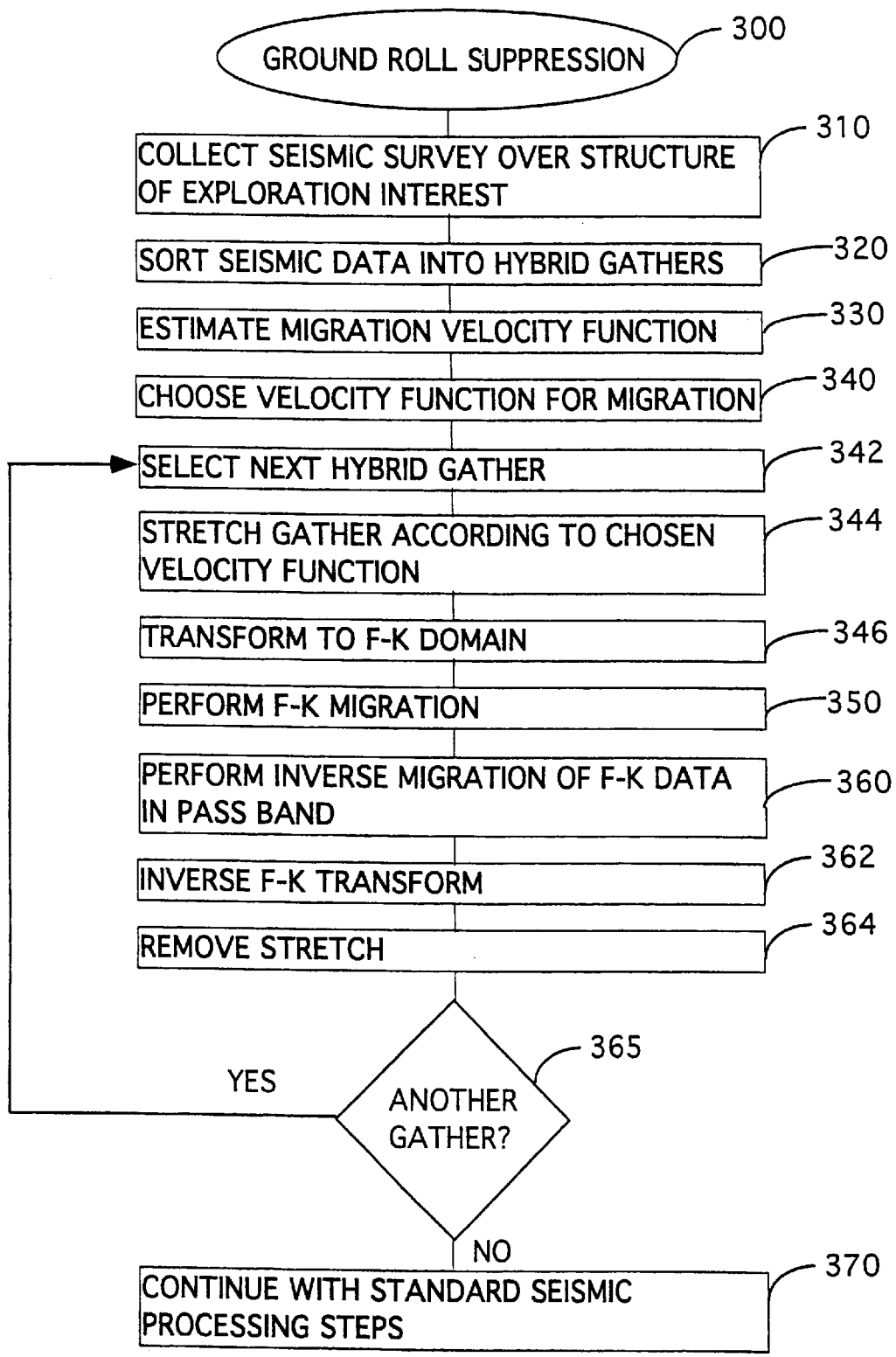
FIG. 3 is a flowchart that illustrates the principal steps in a preferred embodiment of the instant invention.

In more particular and as is illustrated in FIG. 3, a first preferred step in the instant invention is the acquisition of a seismic survey over a target of exploration interest 310. This target might be of many different sorts, but preferably the object of the survey will be to uncover subsurface structures associated with the generation, migration, accumulation, or presence of hydrocarbons. The target might be structural or stratigraphic, to give two specific examples of the sorts of geologic characteristics that are often sought by explorationists.

As a next preferred step, the data are organized into one or more hybrid gathers 320 according to the method taught in U.S. Pat. No. 6,026,058, cited previously. By way of general explanation, the hybrid gather technology of the U.S. Pat. No. 6,026,058 patent may be thought of conceptually as consisting of data from a crossed-array source/receiver layout geometry. One preferred method of obtaining a set of traces that constitute a hybrid gather is to lay out a line of receivers (or a grid of same) and activate a series of sources that "walk" toward the receivers along a linear path that bisects the receivers and is transverse thereto. Preferably, signals are simultaneously recorded from all of the receivers when each source is activated. The traces that are recorded using this sort of geometry then constitute rectangular single-fold coverage of the central one-fourth of the survey area. Of course, it is not necessary to exactly reproduce this geometry to obtain a hybrid gather, but rather—and as is explained in the U.S. Pat. No. 6,026,058 patent—a hybrid gather can be reconstructed after-the-fact from traces collected in a conventional land or marine 3-D survey.

One advantage of performing the migration in the hybrid-gather domain is that the data will be better imaged spatially (i.e., less susceptible to spatial aliasing) than if it were organized into another domain (e.g., common offset, common shot, common receiver, etc.). Further, using this organization each hybrid gather can be individually processed and imaged using techniques that depend on adequate spatial sampling, which techniques are normally reserved for full common midpoint summed gathers. That being said, the instant method is suitable for use with any sort of "gather" or organization of seismic traces that is amenable to migration.

As a next step, a velocity function is estimated for use in the subsequent migration (step 330). This might be a single velocity, or a time and spatially varying velocity function suitable for use in a final migration. As is well known to those of ordinary skill in the art, estimation of such a velocity function 330 might be done in many different ways, but the most popular approach would be through the use of semblance-type velocity analyses (see Yilmaz pp. 47–49, cited previously), wherein a velocity function can be read from a graphic display. Alternatively, the ground roll velocity can be estimated directly from any gather by noting intercept time of the event at the nearest offset and the time it reaches any other offset, the two times taken together with the distance between the recording locations providing all of the information that is necessary to calculate a rough velocity. Of course, the latter approach might lack sophistication, but it would be a preferable approach in the field, where semblance velocity analysis programs are not available, but where plots of individual shot records are readily available. It should be noted that the step of velocity estimation 330 does not require that the data be pre-sorted into any particular organization.

As a next preferred step, a migration velocity function is selected 340. In the preferred embodiment, if a single velocity is used it will be one that is chosen to be slightly higher than the estimated ground roll velocity. The reason for this will be made clearer in the text that follows, but for now it suffices to say that the choice of this sort of velocity will help insure that ground roll events are attenuated at the next step. By way of a specific example, ground roll velocities for land data tend to be about 350 meters/second to 750 meters/second, although it is not uncommon to see events that fall above or below these illustrative limits. In practice, the instant inventors typically choose the migration velocity by trial and error. Ultimately, the velocity is selected which yields the best attenuation of the ground roll with the least damage to the remaining seismic events.

Additionally, it should be noted that, although the preferred embodiment utilizes only a single velocity, that is not a requirement of the instant method, but was done for purposes of computational convenience only. In more particular, determining a single velocity that is subsequently used throughout the entire survey greatly simplifies the calculation of the migration that is performed in the next step. However, it should be clear to those of ordinary skill in the art that any number of velocities might be specified at step 340 (i.e., a time and spatially varying velocity function), with a corresponding increase in the complexity and computational load if those velocities are used subsequently to migrate the data.

As a next preferred step, it is conventional to "stretch" the seismic traces according to the selected velocity function (step 344). One example of how to perform such a stretch may be found in Stolt, "Migration by Fourier transform", Geophysics, v. 43, pages 1664–1674, the disclosure of which is incorporated herein by reference. Those skilled in the art will recognize that the so-called "Stolt stretch" can also be used to accommodate time-varying velocities, in the event that a more complex velocity model has been specified. The purpose of this step is to make the data amenable to migration in the Fourier transform domain.

A next preferred step of the instant invention is to transform the (stretched) gather to the F-K domain 346 via a 2D or 3D (i.e., "multi-dimensional") Fourier transform, as the situation warrants. That is, if the gather is a 2D collection of traces, a 2D Fourier transform (time and offset) will be used. However, if the gather is a 3D collection of traces, a full 3D Fourier transform will be performed (i.e., time, x-offset and y-offset). However, those skilled in the art will recognize that this step is optional if some other migration algorithm is employed. For a condensed discussion of the mathematics of migration, see Appendix C of Yilmaz (cited previously), pp. 507–518, the disclosure of which is incorporated herein by reference.

Figure 4:
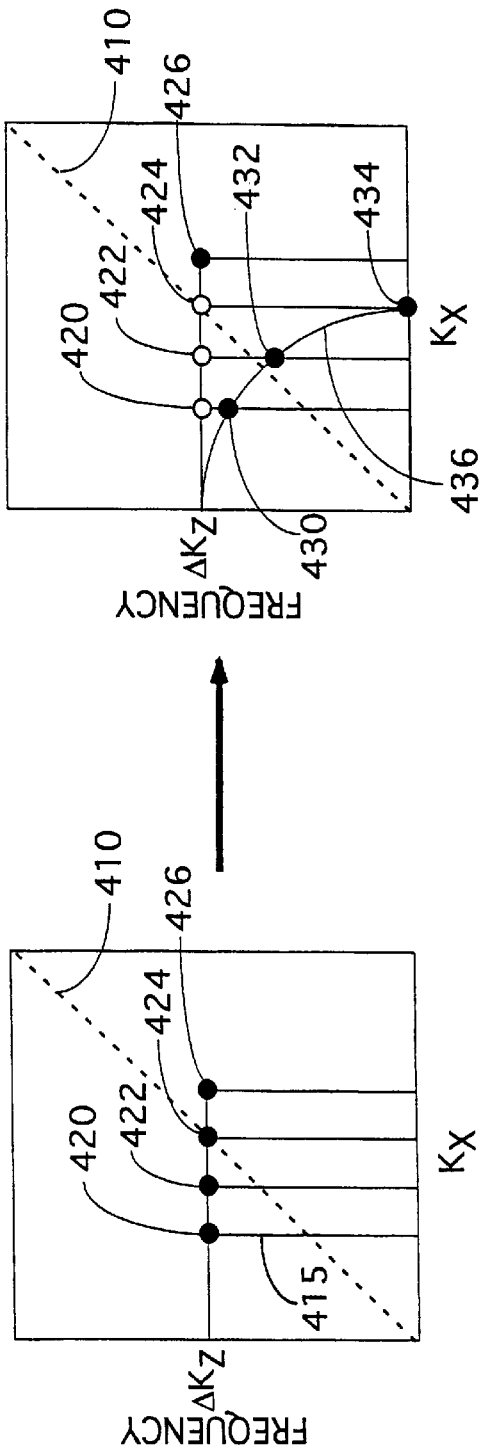
FIG. 4 illustrates schematically how the preferred migration is done in the F-K domain.

In the preferred embodiment, an F-K migration is used to perform the requisite migration 350. FIG. 4 contains a schematic illustration of how that sort of migration is implemented for 2D data. Note that those skilled in the art will recognize that the steps that are schematically illustrated in FIG. 4 may not represent the most computationally efficient method of performing the instant migration and that many computational variants are possible. Further note that only one quadrant of the F-K transform has been shown. There actually are three additional quadrants not shown (four total). However, those skilled in the art will know that only two of these quadrants contain independent information and the instant method need be applied to only two such quadrants (e.g., the two quadrants separated by the positive frequency axis). In FIG. 4, the panels with axes labeled "FREQUENCY" and "$K_X$" represent one F-K transformed 2D gather. The "$K_X$" axis conventionally corresponds to a Fourier transform in the horizontal (e.g., offset) direction and the "Frequency" axis represents a "time" (or depth) transform.

In FIG. 4, the dashed line 410 with slope of 45° relative to the $K_x$ axis will be referred to hereinafter as the attenuation line 410. For purposes of specificity, the term "frequency axis" will be used hereinafter to refer both to a traditional frequency axis and also to the vertical "wave number" ($K_z$) axis which is produced by a time-to-depth conversion. Further, although the attenuation line 410 is preferably a 45° line as is illustrated in FIG. 4, it need not be oriented at precisely that angle and could be situated above or below the illustrated line, parallel with it or not, and intersecting the origin or not. As a particular example, if the frequency increment or the depth increment per time sample point ($K_z$) is changed, the natural attenuation line 410 as defined by the migration algorithm will be varied from 45°. However, it is preferred that the attenuation line 410 be a 45° line in the F-K plane (or a 45° plane in 3D transform space).

Given the foregoing, migration in the F-K plane is relatively straightforward. As a first step, a point 420 is selected. For purposes of specificity, that point will be assumed to have a frequency of $\Delta K_z$. The selected point 420 is then migrated by moving it "downward" in frequency to the point 430 which is at least conceptually the point of intersection between a circle of radius $\Delta K_z$ 436 (centered at the origin) and a vertical line 415 drawn at the wave number of the selected point 420. In the right hand panel of FIG. 4, the point 430 represents the location of the migrated energy from point 420. This process is then potentially repeated for every point in the F-K plane although, as explained below, it is only really necessary to migrate those points that are located above the attenuation line 410.

Note that different points in the plane are migrated differing amounts depending on where they are located in the F-K plane. Compare the migrated location of point 420 with the migrated locations of points 422, 424, and 426. The energy associated with point 422 is moved from above the attenuation line 422 to below it (point 432). This sort of operation is critical for purposes of the instant invention. The point 424 lies on the attenuation line 410 and, as expected, its migrated image 434 is below it: in fact, it is migrated down to the wave number axis. Finally, note that the point 426 cannot be migrated using the instant method, because the "migration" circle 436 never intersects its wave number coordinate. Obviously, this will be true in the instant example whenever a point's wave number coordinate ($K_x$) is greater than its frequency.

Figure 5:
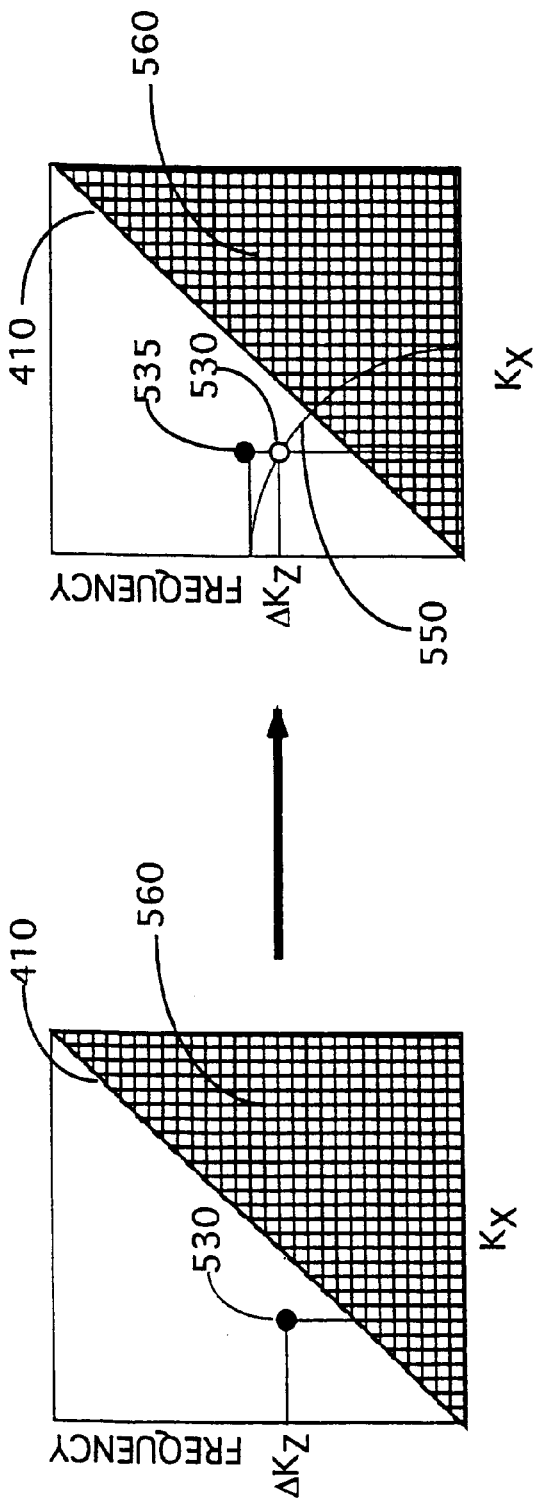
FIG. 5 illustrates a preferred inverse migration suitable for use with the instant invention.

As a next step, a predetermined portion of the F-K plane is inverse migrated 360 (i.e., the migration is removed. However, it is critical for purposes of the instant invention that only a portion of the F-K plane be utilized in calculating the inverse migration. As is illustrated in FIG. 5, the instant embodiment only uses energy (i.e., digital transform points in the F-K plane) that is above the attenuation line 410 when the migration is reversed. Said another way, points below the attenuation line 410 (region 560) are de-emphasized or ignored in calculating the inverse migration. As will be described in greater detail below, the points below the attenuation line 410 need not be completely ignored but could, alternatively, be down-weighted according to a predetermined 2D or 3D weighting function. This possibility should be clear to those of ordinary skill in the art.

FIG. 5, illustrates schematically how the inverse migration is preferably performed. Those of ordinary skill in the art will recognize, once again, that FIG. 5's geometric discussion of how migrated energy is relocated in the F-K plane might not represent the method by which the inverse migration is actually implemented in practice, although the end result should be the same numerically no matter which method is employed. That being said, in brief the process of inverse migration 360 is the reverse of the forward migration process. As is illustrated in the right panel of FIG. 5, the amount that a point is moved up along the constant $K_X$ (vertical) line is determined by the intersection of a circle (of radius equal to the distance from the selected point 530 in the F-K plane to the origin) with the frequency axis. This inverse migration is repeated for as many points in the migrated F-K plane as is desired.

It is critical for purposes of the instant invention that the inverse migration be applied to only a portion of the F-K plane, which portion preferably includes only those points that lie above the attenuation line 410. In the alternative, if the inverse migration is to include points that lie below the attenuation line, the points in the attenuation region 560 must necessarily be at least somewhat attenuated before the inverse migration is applied. This would include both points that were originally below the attenuation line 410 in the unmigrated F-K plane as well as those points that were repositioned below the attenuation line 410 by the migration process. Note that a preferred choice for the attenuation line 410 when an F-K migration is employed is the line below which the inverse migration is not well defined. However, the instant inventors specifically contemplate that the attenuation line 410 might be chosen to be different from the "natural" choice depending on the needs of a particular seismic data set.

The previous step exemplifies the heart of the instant invention. By excluding from the computation of the inverse migration those points in the F-K plane that are below the attenuation line 410, the seismic energy that is associated with ground roll should be excluded from the reconstructed gather or substantially reduced. This will have the ultimate effect of reducing or eliminating ground roll events from the recorded seismic data.

In the preferred embodiment, data not in the pass band (i.e., the data in the cross hatched region 560 of FIG. 5) are completely ignored when the inverse migration is computed, i.e., those data values are effectively set equal to zero. Of course, it should be clear that the energy not in the pass band could alternatively be scaled, filtered, tapered, etc., so as to reduce those amplitudes, rather than zeroing them. Two dimensional filters—and three dimensional filters in the case of 3D data—that would accomplish this are well known.

Figure 6:
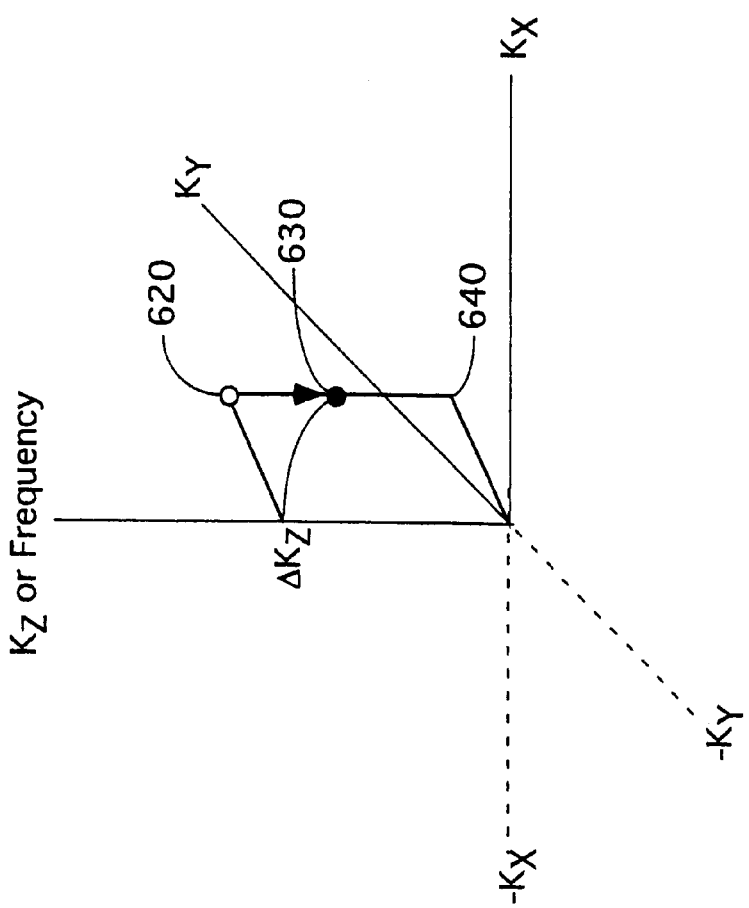
FIG. 6 contains a schematic illustration of how a preferred embodiment of the preferred migration method would work with 3D data.

Of course, those skilled in the art will recognize that the single-velocity 2D method discussed in the previous paragraphs may easily be extended to 3D (e.g., hybrid gather) data. In FIG. 6, one point 620 has been selected from the 3D Fourier transformed volume ($K_X$, $K_Y$, $K_Z$). That point is preferably migrated by swinging a circle of radius $\Delta K_Z$ (i.e., the $K_Z$ or frequency coordinate of the selected point 620) within the plane defined by the points 620, 640, and the origin. The point of intersection 630 is the location of the migrated data point. Of course, when the inverse migration is computed, preferably only those points above an attenuation line that lies on the plane through the origin, 620, and 640, will be inverted. The instant inventors have specifically contemplated that the attenuation line might be oriented at any number of different angles, depending on the precise nature of the ground roll and the velocity (or velocities) used to migrate the prestack traces. In the preferred embodiment, though, the attenuation line will be defined by the spatial and/or temporal sampling intervals $K_z$ or dx. Finally, it should be noted that the term "attenuation line" will be used herein in its broadest sense to refer to both 2D and 3D situations. In the event that the gather is 2D, the attenuation "line" will truly be a line in the F-K plane. On the other hand, if the gather is a 3D gather, the attenuation line will preferably be a line in 3-space which is found within a plane that passes though the origin and which is dependent upon the $K_x$ and $K_y$ spacing.

CONCLUSIONS

Although the instant invention has been described in terms of migration with a single velocity, that was done only for purposes of computational efficiency, and not out of any intent to limit the instant method to that single sort of migration. More generally, any sort of horizontally or vertically varying migration velocity function might be used with the instant invention. However, the use of complex velocity models will substantially increase the amount of computer power needed to perform the prestack migration and inverse migration. Practically speaking, ground roll attenuation with complex velocity functions can only be performed in the processing center where super computers (including massively parallel computers) are available to handle the increased computational load.

Further, it should be clear that rather than ignoring or zeroing all of the energy that has been migrated below the attenuation line/plane, that instead the energy there could alternatively be attenuated before inverse migration according to any preferred 2D or 3D filter.

Still further, although the instant invention has been described exclusively in terms of an F-K migration, those skilled in the art will recognize that a time or depth migration could be used in the alternative, provided that the migration can be induced to move some seismic energy above a predetermined time or depth where it can be recognized and attenuated.

Even further, although the preferred embodiment attenuates or eliminates all seismic energy that has been shifted below the attenuation line, it has been specifically contemplated by the instant inventors that seismic values near or above the attenuation line might also be filtered or attenuated. That is, rather than starting a taper at the attenuation line, the taper might be started at some number of samples above the line and then tapered or filtered down to meet it.

Additionally, although the instant invention has discussed attenuation "lines" and "planes", it should be clear that these features need not necessarily be "straight" or "flat", but instead could take the form of any arbitrary curve.

Although the invention disclosed herein was discussed as preferably involving operations on seismic traces organized into "hybrid" gathers, that was done for purposes of specificity only and not out of any intent to limit the instant invention to operation on only that sort of gather. So, within the text of this disclosure, the term gather is used in the broadest possible sense of that term, and is meant to apply to conventional 2D and 3D seismic gathers, as well as to other sorts of gathers, the most important aspect of a "gather" being that it represents an organized collection of unstacked seismic traces from either a 2D or 3D survey which is amenable to pre-stack migration.

Additionally, the term "ground roll" should be interpreted herein in the broadest possible sense of that term. That term should be taken to include any sort of relatively slow linear seismic event.

Finally, in the previous discussion, the language has been expressed in terms of operations performed on conventional seismic data. But, it is understood by those skilled in the art that the invention herein described could be applied advantageously in other subject matter areas, and used to locate other subsurface minerals besides hydrocarbons, e.g., coal. By way of additional examples, the same approach described herein could be used to process and/or analyze multi-component seismic data, shear wave data, magneto-telluric data, cross well survey data, full waveform sonic logs, or model-based digital simulations of any of the foregoing. Additionally, the methods claimed herein after can be applied to mathematically transformed versions of these same data traces including, for example: frequency domain Fourier transformed data; transformations by discrete orthonormal transforms; instantaneous phase, instantaneous frequency, analytic traces, and quadrature traces; etc. In short, the process disclosed herein can potentially be applied to any collection of geophysical time series, and mathematical transformations of same, but it is preferably applied to a collection of spatially related time series containing structural and stratigraphic features. Thus, in the text that follows those skilled in the art will understand that "seismic trace" is used herein in a generic sense to apply to geophysical time series in general.

While the inventive device has been described and illustrated herein by reference to certain preferred embodiments in relation to the drawings attached hereto, various changes and further modifications, apart from those shown or suggested herein, may be made therein by those skilled in the art, without departing from the spirit of the inventive concept, the scope of which is to be determined by the following claims.

REFERENCES

The documents and texts that are listed below are specifically incorporated by reference into this patent application:

Aki, K. and P. Richards, 1980, *Quantitative Seismology*, Freeman Press, N.Y.

Yilmaz, Ozdogan, 1987. *Seismic Data Processing*, Society of Exploration Geophysicists.

That which is claimed is:

1. A method of attenuating coherent seismic noise for use in geophysical exploration within a predetermined volume of the earth containing structural and stratigraphic features conducive to the generation, migration, accumulation, or presence of hydrocarbons, comprising the steps of:
   (a) accessing at least a portion of a seismic survey that images at least a portion of said predetermined volume of the earth,
      said seismic survey being comprised of a plurality of unstacked seismic traces, each of said plurality of unstacked seismic traces being associated with a gather,
      at least one of said gathers having at least two seismic traces associated therewith;
   (b) selecting at least one migration velocity;
   (c) selecting an attenuation line;
   (d) selecting a gather from said at least one gathers having at least two seismic traces associated therewith;
   (e) performing a prestack migration of said selected gather using any of said at least one migration velocities, thereby producing a migrated gather, said migrated gather containing a plurality of digital samples;
   (f) determining an attenuation region within said migrated gather using at least said attenuation line, said attenuation region containing at least one digital sample therein;
   (g) attenuating at least one digital sample within said attenuation region, thereby producing an attenuated migrated gather;
   (h) performing an inverse prestack migration of said attenuated migrated gather, thereby producing an unstacked enhanced seismic gather for use in the detection of said structural and stratigraphic features conducive to the generation, migration, accumulation, or presence of hydrocarbons.

2. A method according to claim 1, wherein said gather of step (a) is a hybrid gather.

3. A method according to claim 1,
   wherein said each of said at least one of said gathers is a 3D gather, and
   wherein said prestack migration and said inverse prestack migration are both 3D migrations.

4. A method according to claim 1, wherein said at least one migration velocity is at least approximately equal to a ground roll velocity.

5. A method according to claim 1, wherein said attenuation line is a natural attenuation line for said prestack migration.

6. A method according to claim 1, further comprising the step of:
   (i) displaying at least a portion of any enhanced seismic gather so produced.

7. A method according to claim 1, further comprising the step of:
   (i) performing steps (d) to (h) a predetermined number of times, thereby producing a predetermined number of enhanced unstacked gathers.

8. A method according to claim 7, further comprising the steps of:
   (j) sorting said predetermined number of enhanced unstacked gathers into CMP gathers; and,
   (k) stacking at least one of any CMP gathers so produced.

9. A method according to claim 1, wherein step (b) includes the step of selecting more than one migration velocity.

10. A device adapted for use by a digital computer wherein a plurality of computer instructions defining the method of claim 1, are encoded,
    said device being readable by said digital computer, and,
    said computer instructions programming said computer to perform said method.

11. A device according to claim 10, wherein said device is selected from the group consisting of computer RAM, computer ROM, flash RAM, a PROM chip, a RAM card, a magnetic tape, a magnetic disk, a magneto-optical disk, an optical disk, a DVD disk, or a CD-ROM.

12. A method according to claim 1, wherein step (e) includes the steps of:
    (e1) stretching at least a portion of said at least two seismic traces associated with said selected gather using at least one of said at least one migration velocities,
    (e2) transforming said selected gather using a multi-dimensional Fourier transform, thereby creating a Fourier transformed gather, and,
    (e3) calculating an F-K migration from said Fourier transformed gather, thereby producing a migrated gather.

13. A method according to claim 12, wherein step (h) includes the steps of:

(h1) calculating an inverse F-K migration from said attenuated migrated gather, thereby producing an unmigrated gather, and, (h2) transforming said unmigrated gather using an inverse multi-dimensional Fourier transform, and, (h3) removing any stretch applied in step (e1), thereby creating an unstacked enhanced seismic gather.

14. A method of attenuating ground roll noise in seismic data, wherein there is provided a 3D seismic survey conducted over a predetermined volume of the earth, said 3D seismic survey containing a plurality of unstacked seismic traces, said unstacked seismic traces being organizable into at least one hybrid gather having a plurality of seismic traces, comprising the steps of:

(a) selecting at least one migration velocity;

(b) selecting an attenuation line;

(c) selecting a hybrid gather from said at least one hybrid gathers having at least two seismic traces associated therewith;

(d) calculating a three dimensional Fourier transform of said selected hybrid gather thereby producing a transformed hybrid gather;

(e) performing a prestack migration of said transformed hybrid gather using any of said at least one migration velocities, thereby producing a migrated gather, said migrated gather containing a plurality of digital samples;

(f) determining an attenuation region within said migrated gather using at least said attenuation line, said attenuation region containing at least one digital sample therein;

(g) attenuating at least one digital sample within said attenuation region, thereby producing an attenuated migrated gather;

(h) performing an inverse prestack migration of said attenuated migrated gather;

(i) calculating a three dimensional inverse Fourier transform of said attenuated migrated gather thereby producing an enhanced hybrid seismic gather for use in the detection of structural and stratigraphic features conducive to the generation, migration, accumulation, or presence of hydrocarbons within said predetermined volume of the earth.

15. A method according to claim 14, further comprising the step of:

(j) displaying at least a portion of any enhanced hybrid seismic gather so produced.

16. A method according to claim 14, wherein step (a) includes the step of selecting more than one migration velocity.

17. A method according to claim 14, wherein step (e) includes the step of:

(e1) stretching at least a portion of said at least two seismic traces associated with said selected gather using at least one of said at least one migration velocities, (e2) transforming said selected gather using a multi-dimensional Fourier transform, thereby creating a Fourier transformed gather, and, (e3) calculating an F-K migration from said Fourier transformed gather, thereby producing a migrated gather.

18. A method according to claim 17, wherein step (h) includes the step of:

(h1) calculating an inverse F-K migration from said attenuated migrated gather, thereby producing an unmigrated gather, and, (h2) transforming said unmigrated gather using an inverse multi-dimensional Fourier transform, and, (h3) removing any stretch applied in step (e1), thereby creating an unstacked enhanced seismic gather.

19. A device adapted for use by a digital computer wherein a plurality of computer instructions defining the method of claim 14, are encoded, said device being readable by said digital computer, and, said computer instructions programming said computer to perform said method.

20. A device according to claim 19, wherein said device is selected from the group consisting of computer RAM, computer ROM, flash RAM, a PROM chip, a RAM card, a magnetic tape, a magnetic disk, a magneto-optical disk, an optical disk, a DVD disk, or a CD-ROM.

* * * * *